ROBERT V. LANEY.

Improvement in Box and Sleeve for Wheels and Journals.

No. 124,597. Patented March 12, 1872.

Witnesses:
T. C. Brecht.
Edwin James

Inventor:
Robert V. Laney,
per G. E. J. Holmead.
Attorney.

124,597

UNITED STATES PATENT OFFICE.

ROBERT V. LANEY, OF CUMBERLAND, MARYLAND.

IMPROVEMENT IN BOXES AND SLEEVES FOR WHEELS AND JOURNALS.

Specification forming part of Letters Patent No. 124,597, dated March 12, 1872.

*To all whom it may concern:*

Be it known that I, ROBERT V. LANEY, of Cumberland, in the county of Alleghany and State of Maryland, have invented an Improved Box and Sleeve for the Preservation of Journal and Wheel, of which the following is a full, clear, and exact description, reference being had to the accompanying drawing and the letters of reference marked thereon making part of this specification, in which—

Figure 1:
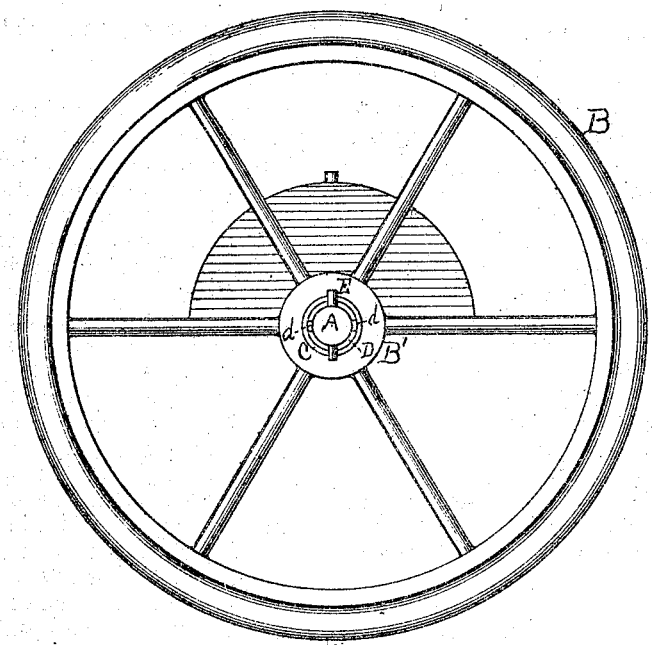
Figure 3:
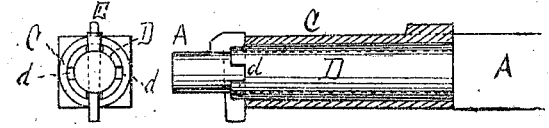
Figure 2:
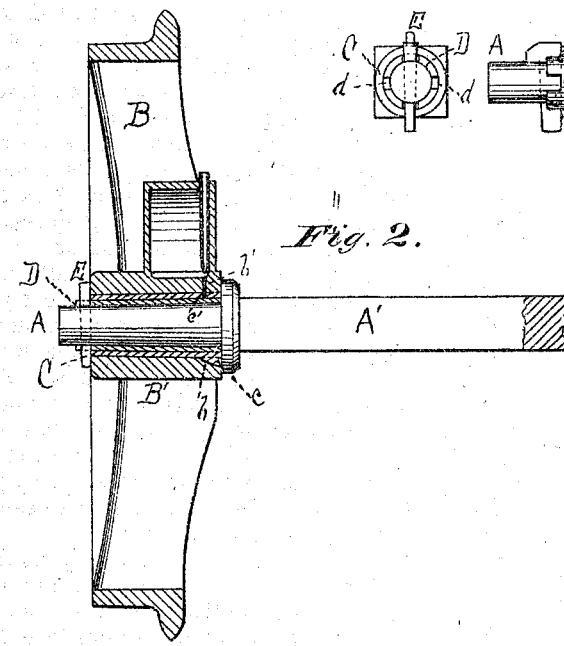

Figure 1 is an outside view of the wheel and lubricating-reservoir. Fig. 2 is a longitudinal sectional view. Fig. 3 is a longitudinal sectional view and an end view of the axle, box, and sleeve.

The object of my invention is to provide the nave or hub of the wheel and pulley and the spindle of the axle and shaft with the means whereby they shall be securely protected from the injurious and destructive effects of the frictional wear incident to their use. To accomplish this (and this constitutes the essence of my invention) I secure within the nave or hub of the wheel and pulley a bush or box, which, while it can be introduced and withdrawn at pleasure, still, by means of a shoulder which enters a slot in the hub, can also be so locked in position, when inserted, as to deny to it any movement but to revolve as does the wheel. I also provide the shaft or spindle of the axle, around which the wheel or pulley revolves, with a counter-box or sleeve, constructed of such dimensions as to fit snugly thereon. At the outer edge of this sleeve are open slots, so cut as nearly to inclose the hole through which passes the linch-pin, and which arrangement permits the linch-pin not only to secure the sleeve in a stationary position, but which also permits the sleeve to be shifted, so that, as one section becomes unduly worn, simply by removing the linch-pin the relative position of the sleeve can readily be so changed as to shift the worn section thereof to a point where it is called upon to encounter less wear; and thus, until the sleeve is entirely worn out, it can be advantageously used. The great value of my invention consists in the entire protection it secures to the wheel and axle. After the box and sleeve are worn out they are removed and fresh ones are supplied and the running-gear or shafting at these points are as good as when originally purchased.

The construction and operation of my invention is as follows: A is the spindle of an axle, A′, or the section of a machine shaft to which the pulley is to be attached. The form and construction of the axle depends, of course, upon the purpose for which it is to be used, as my improvement is applicable to all classes of land conveyances, such as wagons, carriages, railroad cars, and to all agricultural machines and implements, such as harvesters, grain-drills, &c. B is a wheel or pulley, which, while in the drawing is represented as being such a lubricating-wheel as is embraced in my former application for that device, may be of any desired construction. The nave or hub B′ of the wheel or pulley is formed in the usual manner with the exception of this feature: in its annular wall is cut or cast a tapering slot, $b$. C is a cylindrical box or bush, formed of any suitable metal, and of such dimensions as to permit of its fitting closely within the hub. This box is provided with a tapering shoulder, $c$, which, when the box or bush is introduced, enters the slot $b$ and securely fastens it in position, denying to it any movement but that imparted to it by the wheel. When this box or bush C is used in connection with my lubricating-wheel it has cut through its wall an orifice, $c'$, which is at such relative position that when the sleeve is inserted and secured it shall be coincident with the mouth of the lubricating discharge-passage $b'$. D is a cylindrical counter-box or sleeve, cast or otherwise formed out of any suitable metal, and of such dimensions as to fit neatly and snugly over the spindle or shaft in connection with which it is to be used. This sleeve or counter-box D has at its outer end a series of slots, $d\ d$, so cut that each two or pair shall be on a line or directly opposite, so that when the sleeve is placed on the spindle the linch-pin E, that secures the wheel, shall, by passing through two of the slots $d\ d$, also secure, in a stationary manner, the sleeve.

It is well known that the frictional wear of the wheel on the axle is not uniform, and, consequently, it will not be on the sleeve D; but with my arrangement each and every section of the sleeve from time to time can be brought into position where it will be called upon to withstand the greatest wear, and be secured by means of the linch-pin E and slots $d\ d$.

When the box C and sleeve D are worn out they are withdrawn and a new pair introduced, and all the advantages of a new axle and hub are secured.

What I claim as new, and desire to secure by Letters Patent of the United States, is—

The wheel or pulley B, having a slot, b, in its hub or nave, bush or box C, with shoulder c, in combination with the axle or journal A and slotted sleeve D, the whole being so arranged as to operate as described.

In testimony whereof I have signed my name to this specification in the presence of two subscribing witnesses.

ROBERT V. LANEY.

Witnesses:
JOSEPH GONDER,
M. T. BRUCE.